July 30, 1946.   H. F. HANSON ET AL   2,404,960
POWER-PLANT ASSEMBLY AND CONTROL
Filed Oct. 14, 1943

WITNESSES:
Wm. B. Sellers.

INVENTORS
Harold F. Hanson and
John W. Morrow.
BY O. B. Buchanan
ATTORNEY

Patented July 30, 1946

2,404,960

UNITED STATES PATENT OFFICE 2,404,960

POWER-PLANT ASSEMBLY AND CONTROL

Harold F. Hanson, Wilkinsburg, and John W. Morrow, Edgewood, Pa., assignors to Westinghouse Electric Corporation, East Pittsburgh, Pa., a corporation of Pennsylvania Application October 14, 1943, Serial No. 506,200

3 Claims. (Cl. 290—4)

Our invention relates to multiple-unit power-plants, and it has particular relation to transportable power-plants for linear-motor electric catapults for launching aircraft as described and claimed in a general way in an application of Frank B. Powers, Serial No. 473,843, filed January 28, 1943, for Electric towing-car catapult for aircraft, and as more particularly described and claimed in an application of Ruel C. Jones, Serial No. 500,638, filed August 31, 1943, for Electric catapults and power-plants, and an application of Ruel C. Jones and Maurice F. Jones, Serial No. 500,641, filed August 31, 1943, for Prime movers for electric catapults.

An object of our invention is to provide a plurality of portable power-plants which are disposed in spaced, side-by-side relation, and which are mechanically joined together in predetermining spaced relation for mutual bracing against overturning.

A more specific object of our invention is to provide a plurality of portable power-plants, and a control-stand having common control and instrumentation for said power-plants, in combination with disengageable means for mechanically joining them all together in predetermined spaced relation, so that disengageable, mechanically movable connections may be utilized between said control-stand and the several power-plants, for accurate simultaneous operation or control.

Figure 1:
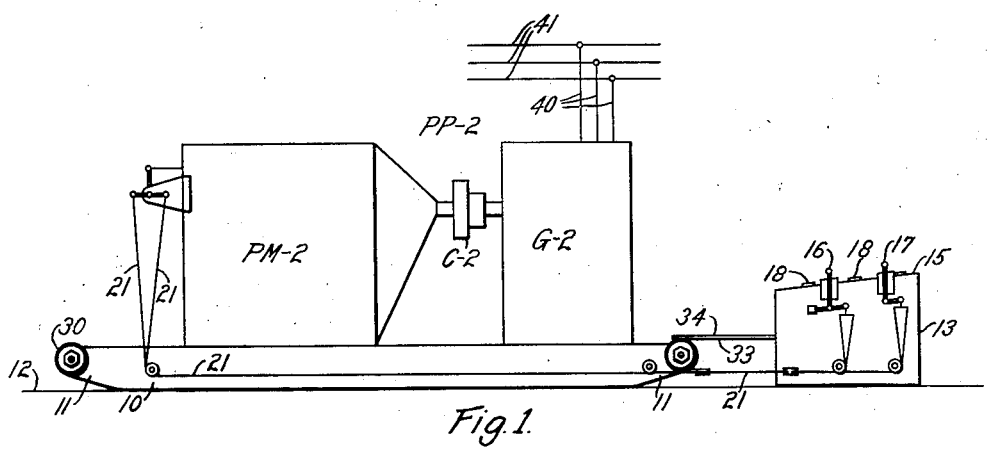
Figure 2:
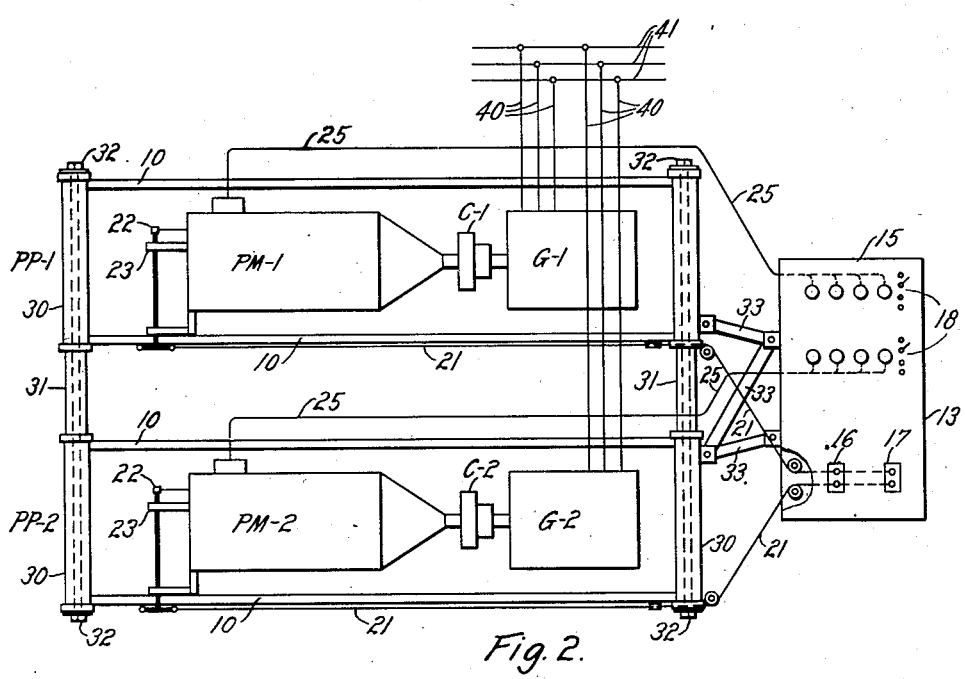

With the foregoing and other objects in view, our invention consists in the combinations, systems, methods, parts and apparatus hereinafter described and claimed, and illustrated in the accompanying drawing, wherein Figure 1 is a side elevational view of a power-plant assembly constructed in accordance with our invention, and Fig. 2 is a plan view thereof.

In accordance with our invention, the entire power-plant assembly is made up of a plurality of power-plant units, any number of which may be utilized. For the purpose of illustration, only two power-plant units are utilized, as shown at PP—1 and PP—2 in Fig. 2. Each power-plant comprises a prime mover PM—1 or PM—2, which may be a gasoline-powered engine, and an electric generator G—1 or G—2, which may be an 80-cycle, three-phase, synchronous generator, each generator having its shaft coupled to the shaft at its engine by means of a coupling C—1 or C—2.

Each of the power-plants PP—1 and PP—2 is preferably mounted on a pair of supporting-skids 10 having upturned ends 11 (Fig. 1), whereby the unit may be readily hauled into place at the edge of a flying-field 12.

The power-plant assembly also includes a control-stand 13, which is shown as comprising a control-pulpit or desk having a slanting top 15, on which are mounted various controlling and indicating devices, specifically, a throttle-control lever 16, a mixture-control lever 17, and various instruments 18. Of these various control-stand mechanisms 16, 17 and 18, some of them, such as the throttle-control lever 16 and the mixture-control lever 17, require disengageable mechanically movable connections, such as control-cables 21, leading to the throttle-lever 22 or the mixture-lever 23, of both or all of the engines PM—1 and PM—2. Others of the control-stand mechanisms, such as the instruments 18, may include various tubing, for electric cables or for mechanical connections, as indicated at 25, for leading to the various power-plant units PP—1 and PP—2.

In accordance with our invention, we provide various disengageable mechanical spacing and joining means for connecting together the various units of the entire assembly, and holding them together, in predetermined spaced relation. Preferably, the portable power-plant units PP—1 and PP—2 are disposed in spaced side-by-side relation, as shown in Fig. 2, and they are disengageably, but rigidly, joined together in this spaced relation. The illustrated means for accomplishing this comprise heavy cross-tubes 30, which join the upturned ends 11 of the two skids 10 of each of the respective power-plant units PP—1 and PP—2. These cross-tubes 30, at the respective ends of the two or more power-plants PP—1 and PP—2, are spaced apart by means of spacer-tubes 31, so that, when the various power-plant units are hauled into place, they may be accurately positioned by these spacer-tubes 31. The entire assembly of the two or more power-plants PP—1 and PP—2 are then drawn together by means of through-bolts or other tension-members 32, which extend through the tubes 30 and 31 at each end of the assembled power-plant units, whereby the various units of the power-plant are rigidly held together.

The control-stand 13 is also held in a fixed, predetermined, spaced relation with respect to the power-plant units PP—1 and PP—2, by means of a plurality of detachable stringers or spacers 33, which may be conveniently covered by a removable platform 34 as indicated in Fig. 1, the platform being omitted in Fig. 2, for clarity of illustration.

In operation, it will be observed that all of the units PP—1, PP—2 and 13 of the entire assembly, are mechanically linked or fastened together in fixed, predetermined, spaced relation to each other, thereby accomplishing several desired results. From the standpoint of the control-stand, some of the connections between the control-stand and the power-plant units require predetermined lengths of connections for accurate simultaneous operation. For example, the control-cables 21 of the mixture-control lever 17 or the throttle-control lever 16 extend to both or all of the engines PM—1 and PM—2, for simultaneously actuating the corresponding levers on both or all of the engines, so that, when the power-demand of the electric generators G—1 and G—2 is changed, all of the prime-movers PM—1 and PM—2 may be controlled simultaneously.

In the illustrated embodiment of our invention, the three-phase terminals 40 of both or all of the generators G—1 and G—2, are parallel-connected to a three-phase feeder or supply-line 41, which is diagrammatically indicated, as being representative of the load-circuit of the generators, and this load is variable, at different times, so that it is necessary to simultaneously vary the prime-mover controls over a fairly wide range, while maintaining synchronous engine-operation through the parallel electrical terminal-connections 40 and the common bus 41.

As a result of our fixed mechanical spacing of all of the parts of the entire power-plant assembly, it is possible for us to utilize mechanical connecting-cables 21 of fixed predetermined length, which do not need to be separately devised each time the power-plant assembly is set up on a different flying-field, or in a new location on the same flying-field. The parts are prefabricated, and devised for instant assembly and disassembly on the field.

Another important advantage of the mechanical spacing-connection 31—32 between the various prime-mover units PP—1 and PP—2, is that the units mutually brace each other, both against vibration, and against the danger of overturning. For example, if the generators G—1 and G—2 should become short-circuited, very great torsional forces would be produced, which might well overturn a single unit standing by itself, on a base as narrow as the distance between the two skids 10 on which it is mounted. However, by placing a plurality of power-plant units in side-by-side relation, and connecting said units together laterally, these several units mutually brace each other against overturning, and also against a certain amount of vibration resulting from the insecurity of the foundation which is afforded by the various skid-members 10 resting upon the somewhat uneven surface of the flying-field 12.

We claim as our invention:

1. A plurality of portable power-plants, a control-stand having common control and instrumentation for said power-plants, and disengageable means for mechanically joining them all together in predetermined, spaced relation, each power-plant comprising a prime-mover and an electric generator driven thereby, and said control-stand including disengageable, mechanically movable connections to a plurality of said power-plants and requiring said predetermined relation for accurate simultaneous operation.

2. The invention as defined in claim 1, characterized by each power-plant having supporting skids having upturned ends.

3. The invention as defined in claim 1, characterized by a plurality of said electric generators being connected in parallel-circuit relation to each other.

HAROLD F. HANSON.
JOHN W. MORROW.